US008281602B2

(12) United States Patent
DiCintio

(10) Patent No.: US 8,281,602 B2
(45) Date of Patent: Oct. 9, 2012

(54) CIRCUMFERENTIALLY SELF EXPANDING COMBUSTOR SUPPORT FOR A TURBINE ENGINE

(75) Inventor: Richard Martin DiCintio, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 658 days.

(21) Appl. No.: 12/557,779

(22) Filed: Sep. 11, 2009

(65) Prior Publication Data

US 2011/0061397 A1 Mar. 17, 2011

(51) Int. Cl.
*F02C 7/20* (2006.01)

(52) U.S. Cl. ........................................ 60/796; 60/39.37

(58) Field of Classification Search ................ 60/39.37, 60/752–760, 796–800

See application file for complete search history.

(56) References Cited

U.S. PATENT DOCUMENTS

| | | | | |
|---|---|---|---|---|
| 2,509,503 | A * | 5/1950 | Huyton | 248/49 |
| 3,759,038 | A * | 9/1973 | Scalzo et al. | 60/800 |
| 5,749,218 | A * | 5/1998 | Cromer et al. | 60/796 |
| 6,662,567 | B1 | 12/2003 | Jorgensen | |
| 6,904,756 | B2 | 6/2005 | Mack | |
| 7,918,433 | B2 * | 4/2011 | Melton et al. | 248/674 |
| 2009/0101788 | A1 | 4/2009 | Kidder et al. | |

* cited by examiner

*Primary Examiner* — Phutthiwat Wongwian

(74) *Attorney, Agent, or Firm* — Dority & Manning, P.A.

(57) ABSTRACT

A bullhorn or support for a turbine combustor is provided. The support maintains proper positioning of the transition element relative to the combustor while also allowing for certain movements of the support to alleviate mechanical stresses during turbine operation. The support is constructed from at least two pieces having an interlocking and releasable connection.

17 Claims, 3 Drawing Sheets

CIRCUMFERENTIALLY SELF EXPANDING COMBUSTOR SUPPORT FOR A TURBINE ENGINE

FIELD OF THE INVENTION

The present invention relates to a bullhorn or support for a turbine combustor that maintains proper positioning of the transition element with the combustor while also allowing for certain movements of the support to alleviate mechanical stresses during operation.

BACKGROUND OF THE INVENTION

A turbine combustor includes a combustion liner that defines a combustion chamber. A transition segment extends between the combustion liner and a turbine first stage. A conventional assembly for securing a transition segment to a combustion liner includes a bullhorn, which acts as a support for the assembly including the combustor. The bullhorn is typically connected to the transition segment in a manner that allows the transition segment to move axially relative to the combustor.

During operation of the turbine engine, substantial mechanical stresses are created. Unfortunately, such stresses can be transmitted to the bullhorn with undesirable effects. For certain turbine constructions, it is desirable to mount the bullhorn on a support ring that is divided into two or more portions. If the bullhorn is mounted between the portions, the stresses transmitted to the bullhorn may become unacceptably high during operation.

Accordingly, a bullhorn or transition segment support that can alleviate mechanical stresses during operation would be useful. A bullhorn or support that can maintain axial alignment during assembly but allow for expansion along radial and circumferential directions during turbine operation would also be useful. A bullhorn that may be used with a multi-piece support ring would be particularly useful.

SUMMARY OF THE INVENTION

Aspects and advantages of the invention will be set forth in part in the following description, or may be apparent from the description, or may be learned through practice of the invention.

In one exemplary embodiment, the present invention provides a support assembly for positioning a transition segment to a combustor of a turbine engine. The combustor defines circumferential, axial, and radial directions. The support assembly includes at least one pair of flanges mounted to the transition segment. A support is also provided for mounting relative to the turbine engine. The support includes at least one pair of arms mated together by an interlocking connection forming part of an elongated section of the support. The interlocking connection is configured so as to fix the axial position of the arms relative to one another while allowing the arms to move along the radial and circumferential directions. The arms each extend along the radial direction. The arms terminate into a pair of fingers that extend along the axial direction and are received by the flanges.

In another exemplary embodiment, the present invention provides a support for securing a transition segment to the combustor of a turbine engine. The support includes a pair of arms releasably attached together by an interlocking connection. The pair of arms provides an elongated section defining the interlocking connection. The interlocking connection is adapted so as to fix the axial movement of the arms relative to one another while allowing the arms to move along radial and circumferential directions of the turbine engine. The arms are connected to the transition segment and configured so as to allow the transition segment to move along the axial direction of the turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
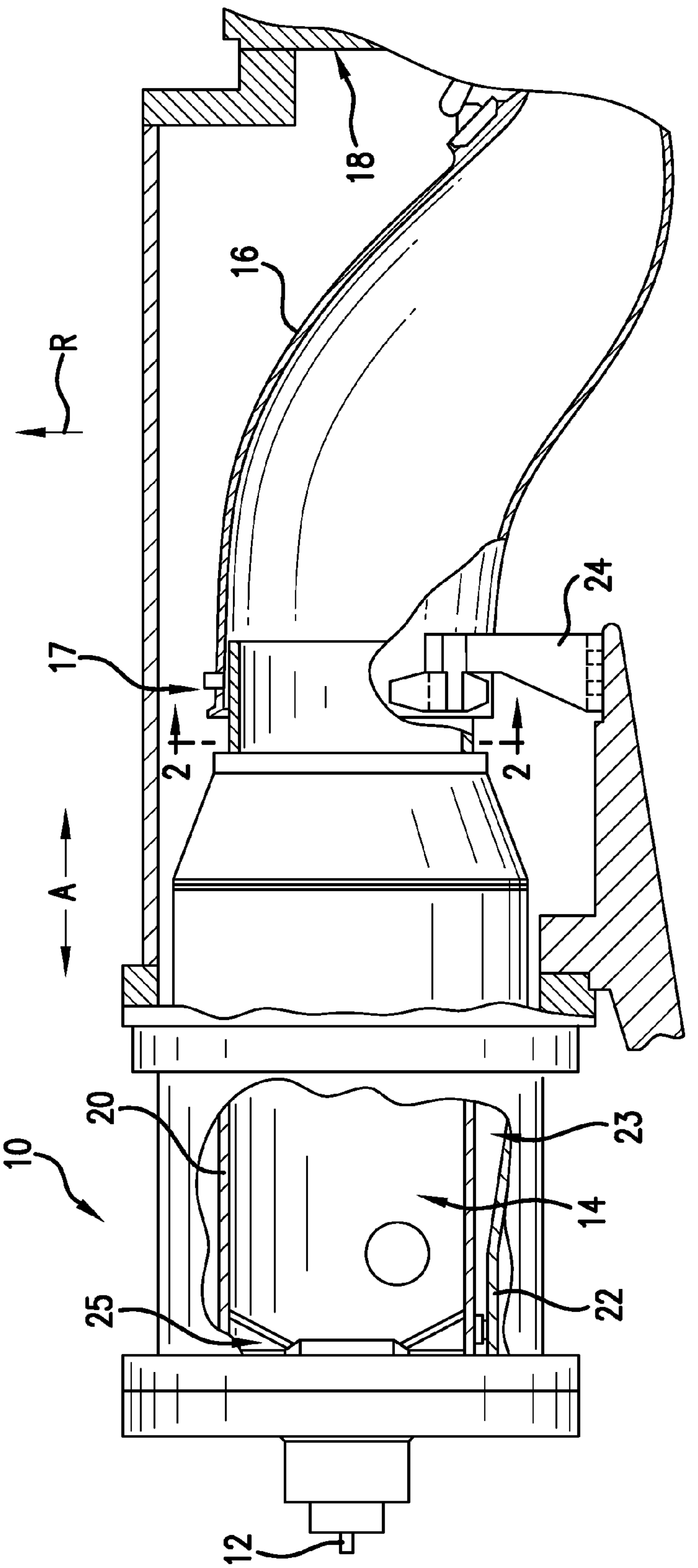
FIG. 1 is a side view of a combustor and transition segment of turbine engine with an exemplary embodiment of a bullhorn or support of the present invention. The present invention is not limited to use with the particular combustor or transition segment shown in FIG. 1 and such are provided by way of context and example only.

The present invention relates to a bullhorn or support for a turbine combustor that maintains proper positioning of the combustor while also allowing for certain movements of the support to alleviate mechanical stresses during operation. Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

As shown in FIG. 1, a combustor assembly 10 of a multiple combustor turbine engine (not shown) includes a fuel nozzle 12 (some turbines employ multiple nozzles in each combustor), a combustion chamber 14 and a transition segment 16 that extends between combustion chamber 14 and a turbine first stage 18. Combustion chamber 14 is defined by a substantially cylindrical combustion liner 20 that, in turn, is surrounded by a substantially cylindrical flow sleeve 22. A radial space between flow sleeve 22 and liner 20 provides an airflow passage 23 that allows compressor discharge air to be reverse flowed to an upstream or nozzle end 25 of liner 20 and then introduced into combustion chamber 14 for mixing with fuel. For purposes of reference herein, the combustor or turbine is shown to define circumferential directions C (FIGS. 2, 3), axial directions A (FIGS. 1, 3), and radial directions R (FIGS. 1, 2).

Transition segment 16 is secured to combustion liner 20 through an axially floating interface 17. More particularly, transition segment 16 is allowed to expand and contract axially along direction A due to exposure to high temperature thermal conditions associated with an operating turbine. The relative movement of transition segment 16 alleviates stresses that would otherwise occur during operation.

Figure 2:
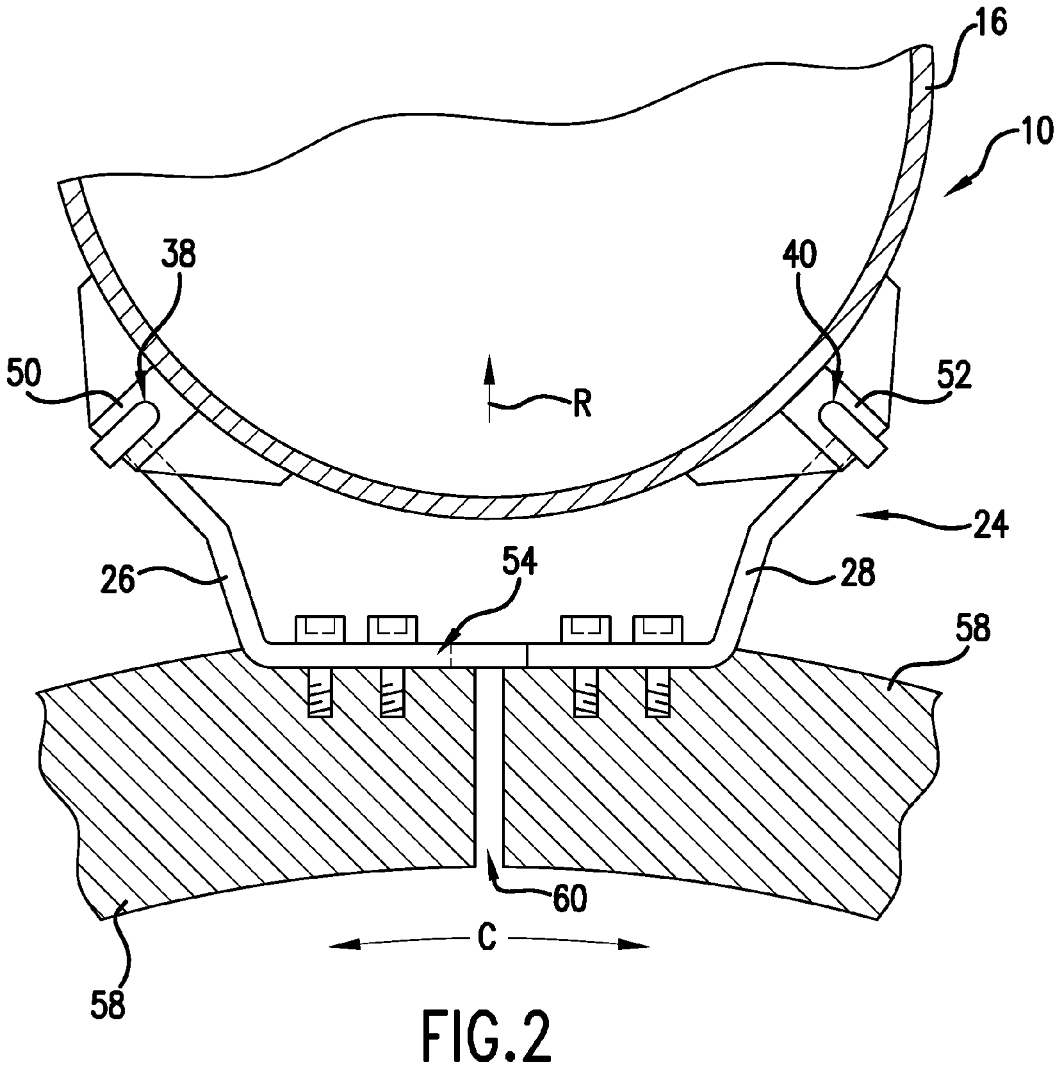
FIG. 2 is a partial cross-section view taken along line 2-2 of FIG. 1.
Figure 3:
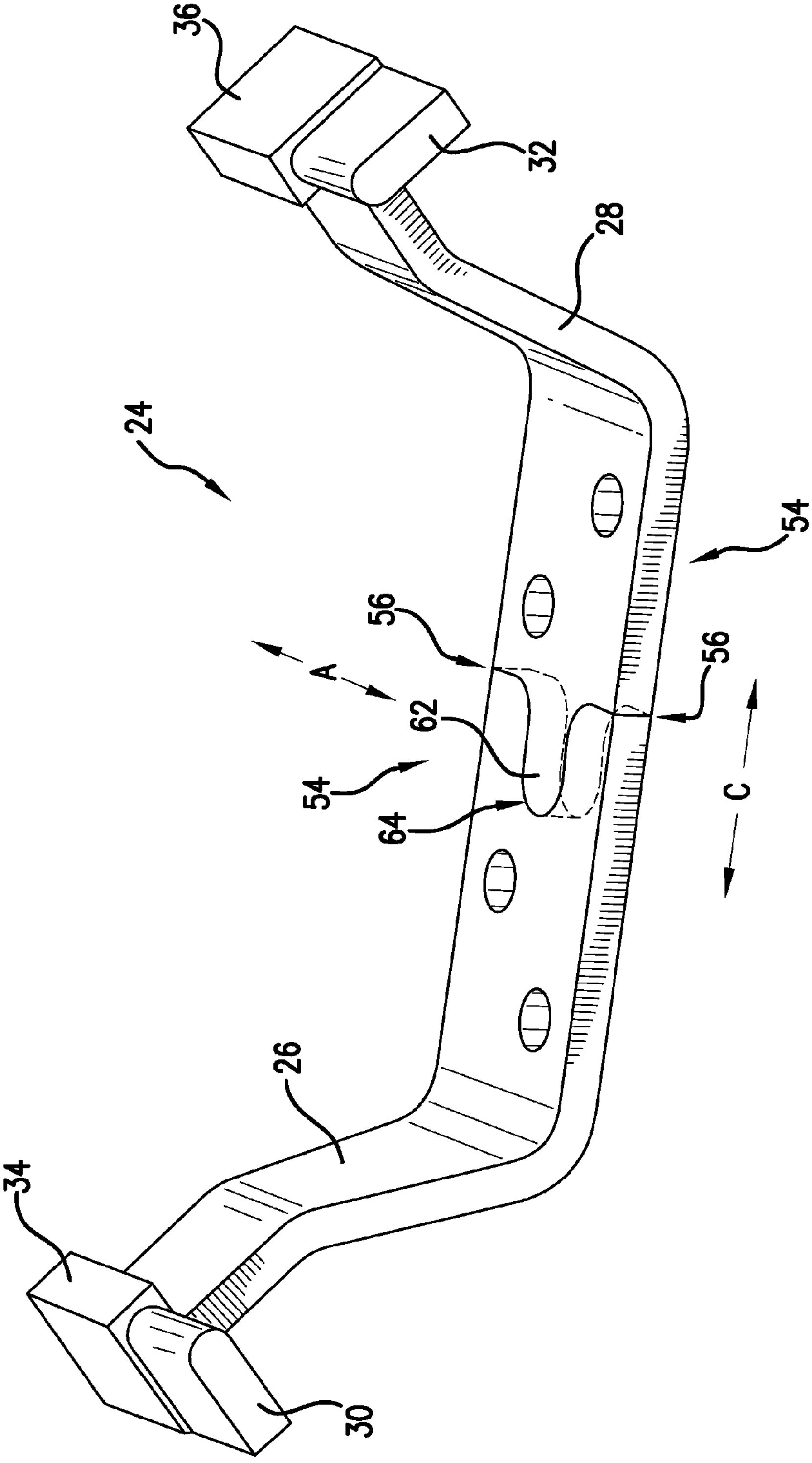
FIG. 3 is a perspective view of an exemplary embodiment of a bullhorn or support as used in FIGS. 1 and 2.

Referring now to FIGS. 1 through 3, a support 24, also known as a bullhorn, is defined by a pair of arms 26 and 28. Arms 26 and 28 extend radially away from an elongated section 54 of support 24 and also project outwardly from each other along the sides of transition segment 16. Each arm 26, 28 of support 24 includes a corresponding axially extending finger 30, 32. Fingers 30 and 32 extend outward from blocks 34 and 36 located at the end of arms 26 and 28, respectively. Fingers 30 and 32 extend axially along direction A and in an upstream direction i.e., towards combustor 10.

Fingers 30 and 32 are received within U-shaped grooves 38 and 40 defined by a pair of flanges 50, 52 positioned on transition segment 16 as best shown in FIG. 2. Flanges 50 and 52 are located adjacent to the upstream or combustor end of transition segment 16. Flanges 50 and 52 allow fingers 30 and 32 to move along the axial direction A during the transient conditions experienced in the operation of the turbine. In a typical assembly for a turbine, a plurality of supports 24 are located circumferentially about the turbine for each of multiple combustors 10 used with the turbine. It should be understood that other combustor constructions may be used with the present invention, and combustor 10 is provided by way of example only.

Referring now to FIG. 2, the arms 26 and 28 are mated together by an interlocking connection 56 that is formed as part of the elongated section 54 of support 24. Interlocking connection 56 is constructed so as to fix the axial position of arms 26 and 28 relative to one another while allowing the arms to move along radial direction R and circumferential direction C. More specifically, because of the configuration of interlocking connection 56, arms 26 and 28 are precluded from sliding or shifting along the axial directions A relative to one another. However, at the same time, interlocking connection 56 does allow arms 26 and 28 to move relative to each other along radial directions R or circumferential direction C.

Accordingly, support 24 provides for the positioning of transition segment 16 relative to combustor 10 while at the same time allowing for a certain degree of freedom to reduce stresses occurring during operation of the turbine. In addition, the fixed positioning of arms 26 and 28 along the axial direction is particularly useful during assembly and installation of transition segment 16 because e.g., interlocking connection 56 will preclude the rotation of arms 26 and 28 relative to one another.

Using the teaching disclosed herein, it will be understood that various other constructions for interlocking connection 56 may be provided that will fix the relative axial movement of arms 26 and 28 while allowing for movement in the radial directions R and circumferential directions C. In FIG. 2, interlocking connection 56 is constructed from a releasably connected tongue 62 and groove 64. More particularly, tongue 62 can be readily removed from groove 64 by continued movement along the circumferential or radial directions C and R. By way of example, other constructions for interlocking connection 56 include a saw-tooth shape, one or more slotted shapes, a wedge shape and others.

As best seen in FIG. 2, support 24 is mounted upon a support ring 58 having a split or discontinuity 60. For certain turbine constructions, split 60 is preferable because it allows the different portions of support ring 58 to move relative to one another. In such case, support 24 is particularly useful because it eliminates or reduces certain substantial stresses that would otherwise occur during turbine operation. For example, in the event support ring 58 expands along circumferential direction C during operation, support 24 will also allow expansion without experiencing unacceptable stresses therefrom.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. For example, in addition to what is shown in the figures for support 24, the present invention can include supports having others shapes and orientations including, for example, different shapes and orientations for the arms and/or fingers provided movement is controlled as described above. Such other examples are intended to be within the scope of the claims if they have structural elements that do not differ from the literal language of the claims, or if they include equivalent structural elements with insubstantial differences from the literal language of the claims.

What is claimed is:

1. A support assembly for positioning a transition segment to a combustor of a turbine engine, the combustor defining circumferential, axial and radial directions, the support assembly comprising:

at least one pair of flanges mounted to the transition segment; and a support for mounting relative to the turbine engine, the support comprising at least one pair of arms mated together by an interlocking connection forming part of an elongated section of said support, the interlocking connection configured so as to fix the axial position of the at least one pair of arms relative to one another while allowing the at least one pair of arms to move along the radial and circumferential directions, the at least one pair of arms each extending along the radial direction, the at least one pair of arms terminating into a pair of fingers that extend along the axial direction and that are received by said flanges.

2. A support assembly for positioning a transition segment to a combustor of a turbine engine as in claim 1, further comprising a support ring mounted to the turbine engine, wherein said support is mounted onto said support ring.

3. A support assembly for positioning a transition segment to a combustor of a turbine engine as in claim 2, wherein said support ring defines a split, and wherein the interlocking connection is positioned radially adjacent to the split.

4. A support assembly for positioning a transition segment to a combustor of a turbine engine as in claim 1, wherein said support ring defines a discontinuity such that said support ring is divided into at least two portions with each such portion connected to one of the at least one pair of arms.

5. A support assembly for positioning a transition segment to a combustor of a turbine engine as in claim 1, wherein the interlocking connection comprises a tongue and groove connection.

6. A support assembly for positioning a transition segment to a combustor of a turbine engine as in claim 1, wherein each arm of the at least one pair of arms includes at least one aperture for securing said support to the turbine engine.

7. A support assembly for positioning a transition segment to a combustor of a turbine engine as in claim 1, wherein said arms project radially away from the elongated section and outwardly from each other.

8. A support assembly for positioning a transition segment to a combustor of a turbine engine as in claim 1, wherein the support assembly allows for an axially floating interface between the combustor and the transition segment.

9. A support for securing a transition segment to a combustor of a turbine engine, the support comprising:

a pair of arms releasably attached together by an interlocking connection, said pair of arms providing an elongated section defining the interlocking connection, said interlocking connection adapted so as to fix the axial movement of said arms relative to one another while allowing said arms to move along radial and circumferential directions of the turbine engine, said arms terminating into a pair of fingers that are connected to the transition segment and configured so as to allow the transition segment to move along the axial direction of the turbine engine.

10. A support for securing a transition segment to the combustor of a turbine engine as in claim 9, wherein the interlocking connection comprises a tongue and groove connection.

11. A support for securing a transition segment to the combustor of a turbine engine as in claim 9, wherein the interlocking connection comprises one or more slots defined by said elongated section.

12. A support for securing a transition segment to the combustor of a turbine engine as in claim 9, wherein the interlocking mechanism comprises a saw-tooth connection.

13. A support for securing a transition segment to the combustor of a turbine engine as in claim 9, further comprising a supporting ring to which the support is attached.

14. A support for securing a transition segment to the combustor of a turbine engine as in claim 13, wherein said supporting ring is divided by at least one discontinuity.

15. A support for securing a transition segment to the combustor of a turbine engine as in claim 14, wherein the interlocking connection of the elongated section is positioned adjacent to the at least one discontinuity of said supporting ring.

16. A support for securing a transition segment to the combustor of a turbine engine as in claim 9, wherein each of said arms terminates in at least one finger oriented along the axial direction.

17. A support for securing a transition segment to the combustor of a turbine engine as in claim 16, wherein each of the arms is adapted to allow the transition segment to move along the axial direction relative to said support.

* * * * *